Oct. 15, 1968 A. L. HOPPER 3,406,344

TRANSMISSION OF LOW FREQUENCY SIGNALS BY MODULATION OF VOICE CARRIER

Filed July 1, 1964 3 Sheets-Sheet 1

INVENTOR
A. L. HOPPER
BY G. E. Hirsch Jr.
ATTORNEY

Oct. 15, 1968 A. L. HOPPER 3,406,344

TRANSMISSION OF LOW FREQUENCY SIGNALS BY MODULATION OF VOICE CARRIER

Filed July 1, 1964 3 Sheets-Sheet 2

3,406,344

TRANSMISSION OF LOW FREQUENCY SIGNALS BY MODULATION OF VOICE CARRIER

Andrew L. Hopper, Murray Hill, N.J., assignor to Bell Telephone Laboratories, Incorporated, New York, N.Y., a corporation of New York Filed July 1, 1964, Ser. No. 379,587
10 Claims. (Cl. 325—50)

ABSTRACT OF THE DISCLOSURE

Speech signals are modulated by low frequency data signals to produce sidebands for simultaneous transmission of the data signals along with the speech over a common channel. The data signals are suppressed in the modulation process and the speech frequency carrier and at least one modulated sideband are transmitted. Since the carrier (speech) is discontinuous and highly variable in amplitude the data signals are stored and used to modulate the speech through a modulation index control network only during speech bursts. An ordinary envelope detector is used to recover the data signals at the receiver.

This invention relates to communication systems and more particularly to systems for the transmission of low information rate signals along with voice frequency information on a common message channel.

A number of services have been proposed which utilize a telephone circuit both for the transmission of ordinary telephone messages, e.g., voice frequency signals, and for the transmission of auxiliary signals, e.g., low information rate data signals or the like. In some, such as telemetry, and the remote reading of service meters, auxiliary transmissions occupy substantially the entire bandwith of the channel but take place only in the absence of voice frequency signal transmission. Alternatively, the auxiliary transmissions take place simultaneously with the speech signal transmission but are restricted to those frequencies in the transmission band, if any, that are not required for the speech transmissions. Both services may not use the same band at the same time. As a result, there is no mutual interference; telephone service may take place as usual and without interference. In others, it is desirable for data service to coexist with speech service in time or in frequency or in both. For example, in order to identify the source of annoying or threatening telephone calls, it is convenient to encode either the speech signal of a party receiving such a call in order to initiate a line tracing operation at the central office, or to encode the signals emanating from one or a group of telephone instruments in order to permit calls from those instruments to be identified. In either case, the code (data) signals must accompany the voice transmission and yet not be apparent to either party on the line.

It is a principal object of the present invention to transmit low frequency data signals simultaneously with speech frequency signals over a common channel in such a fashion that the data signals, though independently readable, are virtually undiscernible to the recipient of the speech signals.

This and other objects are realized in the present invention by treating speech frequency signals as a carrier for low information rate data signals. Speech frequency signals are modulated by low frequency data signals such as binary, multilevel, or multifrequency digital or analog signals, to produce sidebands which carry the low frequency information. The data signals themselves are suppressed in the modulation process. One of the sidebands may be suppressed, if desired, by conventional single sideband modulation techniques. At least one sideband or a portion of one sideband and the speech frequency signals (carrier) are retained for transmission. It has been found that if the data signal frequencies are thoroughly suppressed there is virtually no interference with the speech transmission, speech signal quality is virtually unimpaired, and the bandwidth required for composite transmission is very nearly the same as that required for speech alone. By restricting the bandwidth of the speech signals slightly, the composite transmission may, in fact, be contained within an established channel, again with virtually no interference to normal speech transmission. At the receiver, ordinary envelope detection may be used to recover the data signal information. Speech signals may be reproduced without further processing.

Since the data information can be transmitted only during actual speech, i.e., since bursts of speech act as the carrier, the information rate of the data service is highly variable. It is in accordance with the present invention to accommodate such a variable information rate. This is done by sporadically transmitting the data message information. Only a fragment of the signal is transmitted during each successive speech burst, and the fragments are reassembled at the receiver. Alternatively, longer sections of the data message are sent by the provision of redundancy in the transmission of the data message signals. Redundancy insures a satisfactory low error rate in the data transmission. It is achieved preferably by the repeated transmission of the data information. With the first alternative, most of the data processing takes place at the receiving station. With the latter, most processing takes place at the transmitter. In either case, it is preferable to place the data message information in storage temporarily at each station so that it may read out intermittently as called for by a speech carrier responsive network.

For message service auxiliary to normal telephone service, the data modulation apparatus of the invention is placed in operation whenever it is desired to transmit a data message. For line tracing service, the called party is provided with data modulation apparatus in accordance with the invention which is placed on the line whenever an annoying or threatening call is received. A coded data signal indicating the called party's identity is then transmitted to a central office station to indicate that a line tracing operation should be undertaken. Alternatively, data modulation apparatus may be placed on each telephone instrument in a particular area in order to encode all speech signals emanating from that station. Speech signals from that instrument passing through a central office or other monitoring station may then be automatically identified. This latter alternative form of encoding may also be used in billing for special services.

The invention will be fully apprehended from the following detailed description of illustrative embodiments thereof taken in connection with the appended drawings, in which.

Figure 3:
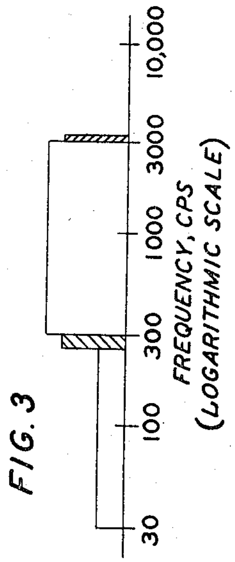
Figure 4:
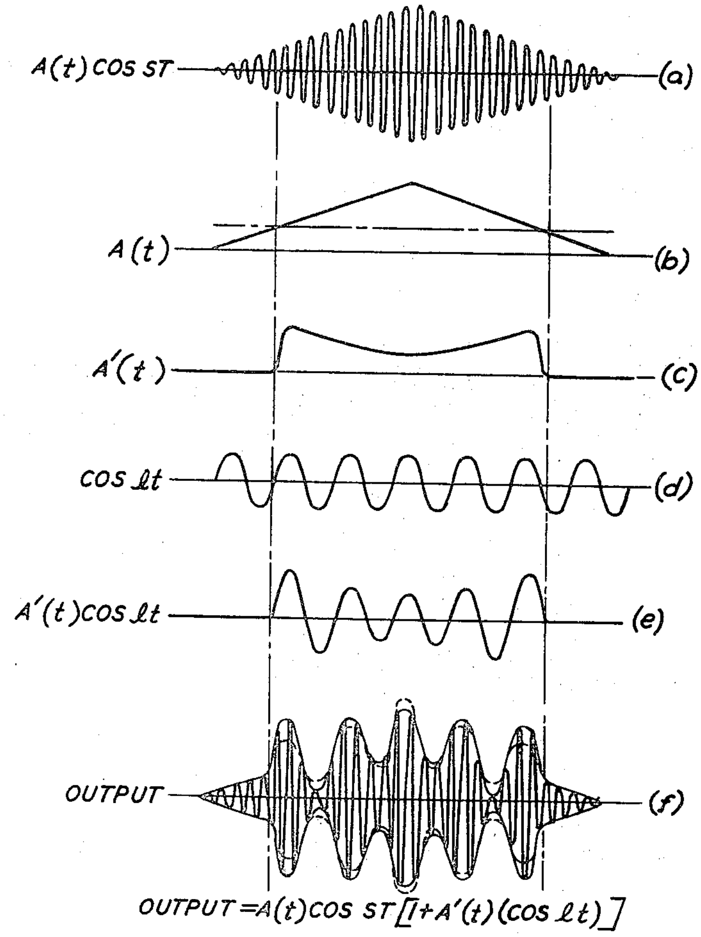
Figure 6:
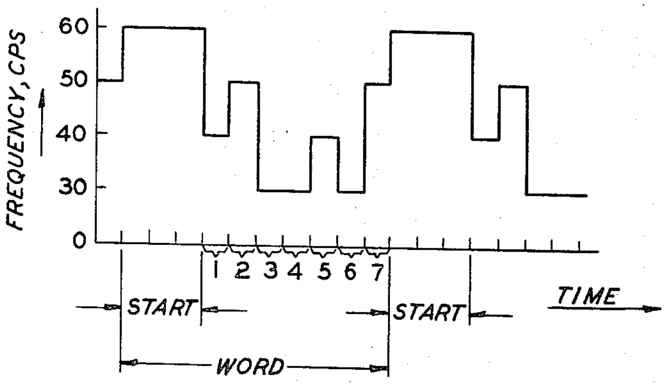
Figure 5:
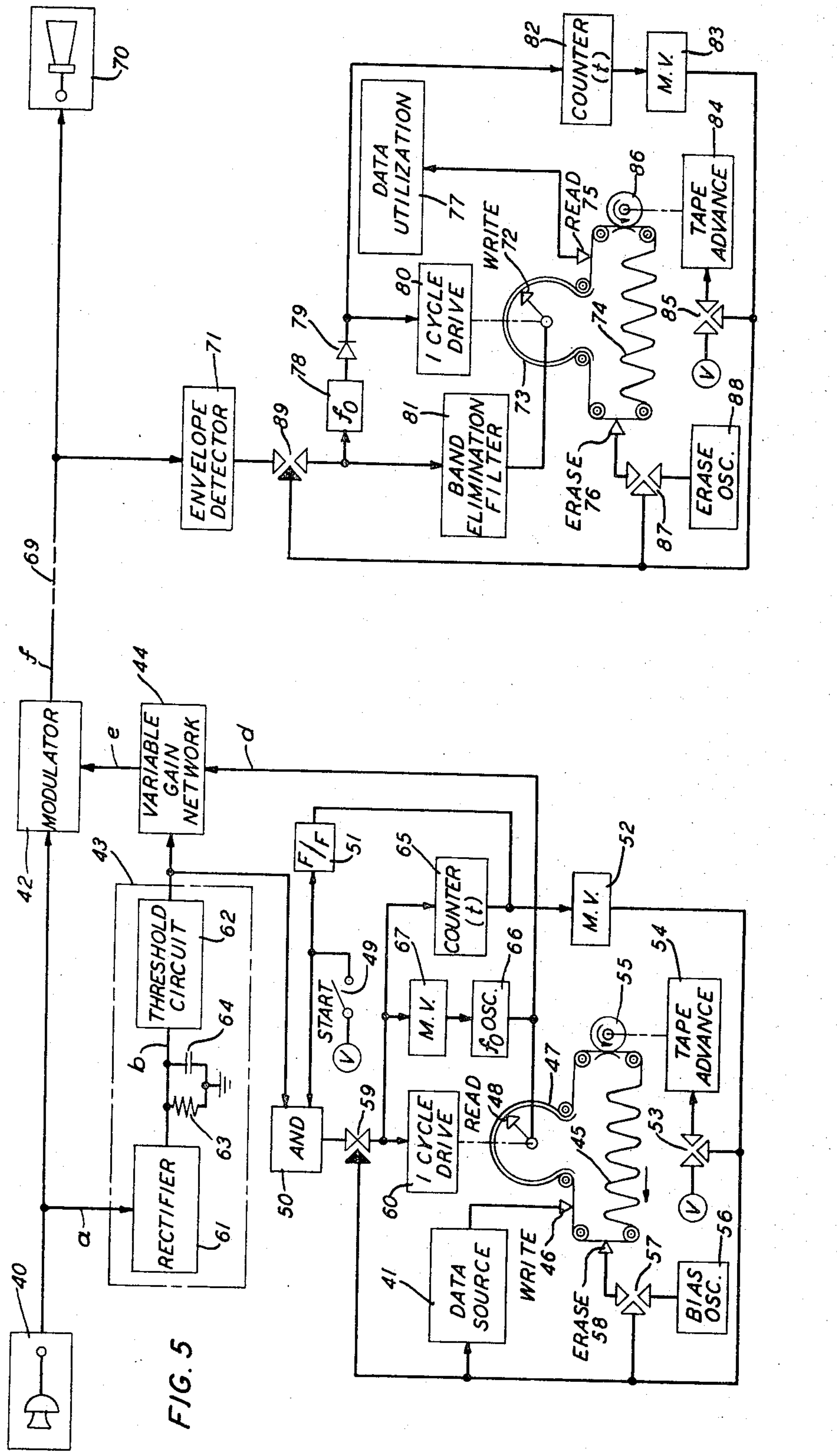

FIG. 3 indicates, on the frequency scale, typical channel assignments for voice frequency and auxiliary message data service;

FIG. 4 is a group of greatly simplified waveforms which indicate the mode of speech signal modulation employed in the practice of the invention;

FIG. 5 is a simplified block schematic diagram illustrating an alternative speech encoding system in accordance with the invention; and FIG. 6 illustrates a typical code signal which may be transmitted as an accompaniment to a telephone signal in accordance with the invention.

Figure 1:
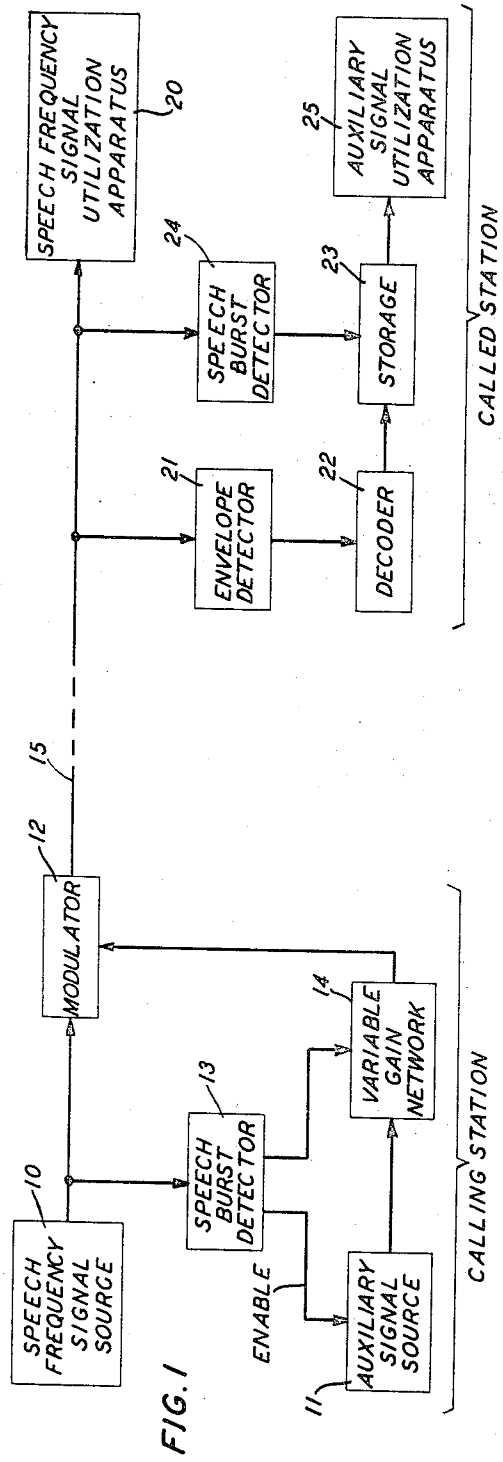
FIG. 1 is a simplified block schematic diagram of two stations of a voice frequency communication system equipped with auxiliary data message transmission apparatus in accordance with the invention.

FIG. 1 illustrates in greatly simplified form, apparatus for permitting low frequency signals to be transmitted along with speech frequency signals from one station to another. Speech frequency signals originating in source 10, which may be simply a telephone subset or the like, and low frequency signals from source 11 are supplied independently to modulator 12 wherein they are combined for transmission to a distant station. The auxiliary signals originating in source 11 may be any form of low frequency signals such as a slowly varying alternating current wave, pulse code signals, or code signals consisting of a plurality of different tone frequencies occurring together or in a specified time order. For a typical application, a code signal consisting of, for example, from five to seven individual digits, is sufficient to encode telephone signals emanating from source 10 so that line tracing operations or the like may be carried out at a central office station. It is assumed in this application of the invention that source 11 generates a single code word repetitively, for example, by means of a mechanical tone generator, a card scanner or reader, or a fully electronic code word generator. A binary sequence of digits similarly permits adequate identification of the words of a nonrepetitive message. The source may thus supply complete messages in an appropriate code form and at a relatively low readout rate.

Speech frequency signals are supplied directly to modulator 12 without further processing. Auxiliary signals from source 11 are passed by way of variable gain network 14 wherein they are equalized in a manner to be described more fully hereinafter. In the modulator, bursts of speech frequency energy are used as the carrier for the auxiliary signals. In usual fashion, the modulation process yields the speech frequency signal, the auxiliary signal, and the sum and difference of the two. However, in contrast to conventional modulation, these sum and difference frequencies are distributed within the speech band itself and it is these sidebands of the speech that carry the auxiliary signals. These distributed sidebands are only slightly higher and lower in frequency than the individual speech frequency components, as distinguished from conventional modulation wherein the speech frequency band is transposed to frequency regions entirely above and below a relatively high frequency carrier. A set of sidebands distributed throughout the voice band of frequencies can be removed by cancellation. Hence, as in conventional modulation, unwanted frequencies can be eliminated from the output by using a pair of modulators in a balanced configuration. Balance in the modulators suppresses the auxiliary signal frequencies and retains only the speech and the speech sidebands. Alternately, the auxiliary signal frequencies can be suppressed by filtering the signal produced by the modulation process.

Figure 2:
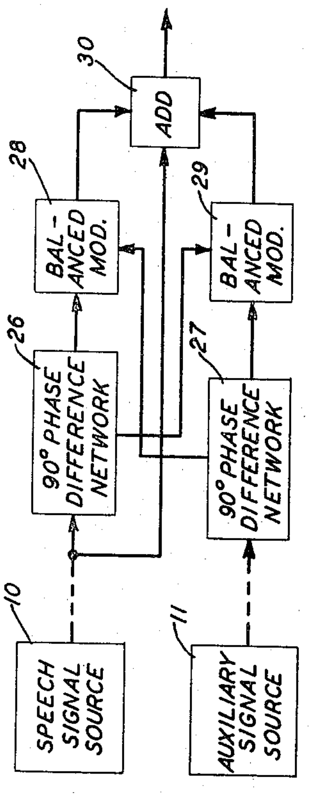
FIG. 2 is a schematic block diagram of a single sideband modulator suitable for use in the practice of the invention.

A typical balanced modulator adapted for use in the practice of the invention is shown in FIG. 2. Speech signals are connected to the usual (push-pull) balanced modulator input terminals. The other input terminals are connected to the auxiliary input source whose frequencies are eliminated from the output by balance. In addition, the quadrature phase networks 26 and 27 permit either the upper or lower set of sidebands to be suppressed even though distributed within the voice range. Since the speech signals would also be suppressed with this connection, provision is made for reintroducing the speech signals at adder 30 which is supplied with the outputs of the balanced modulators 28 and 29. Thus, only speech signals and one set of sidebands are retained for transmission.

Modulator 12 may thus be either unbalanced, double sideband balanced, or single sideband balanced. In the unbalanced case, filtering must be used to suppress the auxiliary signal frequencies. With balanced modulators, filtering may be used if it is desired to restrict the band of frequencies transmitted more nearly to the original speech band. For convenience, it is assumed that all of the necessary apparatus for preparing the signal for transmission is carried out in the block labeled modulator 12.

The frequency band occupied by a typical telephone signal is illustrated in FIG. 3. It normally extends from approximately 300 cycles to 3,000 cycles. With the transmission of an auxiliary signal, whose maximum frequency, is for example, 55 c.p.s., as a set of sidebands of the speech carrier, the band extends from 245 to 3,055 c.p.s. This is much less than an octave even at the low end of the speech band. If the lower sideband is removed, the normal speech frequency band is extended upwardly only slightly. Thus, the modulation and filtering may be arranged to produce a composite signal which occupies only the channel width allocated to speech frequencies. The modulation process of the present invention does not therefore interfere with auxiliary telegraph transmissions or the like which may take place in the band below 300 or above 3,000 cycles per second. Also, since the speech and speech sidebands are almost entirely within the normal speech band of frequencies, this process does not interfere with the normal transmission of speech involving various switching, signaling, and modulating methods common to the communication art. For example, the speech and speech sideband composite signal can be modulated by any of the conventional time or frequency division techniques such as AM, FM, or PCM for transmission by wire, cable, radio, or other media.

Since speech energy bursts constitute the carrier for the auxiliary signals and since speech is a noncontinuous signal, it is apparent that transmission of the auxiliary signals cannot take place in real time. It is in accordance with the invention to supply the auxiliary signals to the modulator only during speech bursts. This is accomplished by continuously monitoring the speech signals for bursts of energy in detector 13. Whenever a speech burst of appropriate magnitude is detected, auxiliary source 11 is enabled and variable gain network 14 is adjusted so that an appropriate signal is supplied to the modulator. At the end of the speech burst, the enabling signal is withheld and the flow of signals to the modulator is stopped.

The start-stop nature of the auxiliary signal transmission may be carried out in a number of ways. For example, the auxiliary signals may be recorded on magnetic tape in real time and then placed on a start-stop tape reproducer, well known in the art, under control of the enabling signal from detector 13. For each detected speech signal burst, a portion only of the code signal is read out. At the end of the speech burst, the tape mechanism is stopped instantaneously to await the next enabling signal. Alternatively, and preferably for repetitive code signals used for line identification, each code word is repeated a number of times before the next word is transmitted. The redundancy afforded by repeated transmission of this sort has been found to reduce substantially the error rate in reception. It does not, however, seriously interfere with the nature of the signal encoding, at least in most applications. An example of this latter form of repetitive transmission will be described in connection with the apparatus of FIG. 5.

In order to assure that the sideband information accompanying the speech frequency signal does not cause appreciable distortion of the speech signal as a result of auxiliary signals of excessive amplitude, it is in accordance with the present invention to maintain an optimum depth of modulation despite variations in the magnitude of the speech signals. This is carried out by passing the auxiliary signals through variable gain network 14 which is under control of speech burst detector 13. A variolosser network is satisfactory. Thus, as individual speech bursts are encountered, their magnitude is measured and the measure is employed to adjust the gain of network 14 thus to maintain an optimum relation between speech carrier level and auxiliary signal level. In addition to reducing distortion, variable index modulation improves the receiver recognition margin.

Signals emanating from modulator 12 are transported via transmission channel 15 to a receiver station. Speech frequency signals are supplied directly to speech frequency utilization apparatus 20, which may be the receiver of a telephone subset. Since the auxiliary signal transmission appears as a sideband only, it is virtually indiscernible in a normal speech conversation. Distortion of speech signals attributable to auxiliary signal sidebands has been measured and found to be virtually unnoticeable in ordinary speech conversations so long as the index of modulation is controlled, and the ratio of sideband signal to carrier signal is low.

The speech signals with the modulation sideband are supplied, in addition, to envelope detector 21 wherein the sideband information is recovered and the speech frequency carrier is discarded. In contrast to conventionally modulated signals, the speech sidebands cannot be separated from the speech carrier by means of linear frequency-separation filters (except for the narrow frequency bands above and below the voice band shown in FIG. 3). An envelope detector, such as a diode detector with a relatively short time-constant, is sufficient for the required separation. The auxiliary signal information recovered in detector 21 is supplied to decoder 22, if required, to transform them into a usable form, i.e. by the conversion of multifrequency information into pulse code information or the like. Auxiliary transmission of analog data would not, of course, require such a decoding operation. The decoded signals of whatever form are next placed in storage as they are received. Since reception ordinarily is at a relatively random rate, storage apparatus 23 is employed to accumulate the received signals under control of an enabling signal supplied by speech burst detector 24. Detector 24, as detector 13, monitors the speech frequency signal and provides an enabling signal only during speech bursts of sufficient magnitude. The enabling signal thus energizes storage apparatus 23 to permit decoded signals to be placed in storage. When a sufficient number of fragments of information have been received and stored, the entire message may be read out and supplied to auxiliary signal utilization apparatus 25.

FIG. 4 illustrates by way of a number of graphic displays the modulation system by which the feature of the invention are turned to account. A greatly stylized portion of a speech frequency wave, $A(t)\cos st$, is illustrated at a line *a* and its envelope, $A(t)$, is illustrated at line *b*. An arbitrary threshold is established at a level that provides sufficient carrier for the low frequency signal to be detected at the receiver. This threshold is used to control the transmission characteristic of the variable gain network. As shown in line *c*, the network exhibits gain for signals above threshold and no gain for signals below threshold. The transfer characteristic, $(A'/A)$, preferably has a sharp threshold and a smooth characteristic beyond this point. Assuming for this example that the auxiliary signal consists of a continuous wave, $\cos lt$, shown in line *d*, the cosine wave is adjusted by the variable gain characteristic of the network. The resultant, $A'(t)\cos lt$, is shown at line *e*. It is used to modulate the speech carrier of line *a* to produce an output signal, $A(t)\cos st\,[l+A'(t)\cos lt]$, as shown in line *f*. The output signal of line *f* has superimposed on it a dashed-line envelope indicating the envelope that would have occurred without the action of the variable gain adjustment. It will be appreciated that the varitions of the dashed-line envelope are considerably greater than those with the adjusted signal. Consequently, the likelihood of signal distortion is increased. With variable index modulation, distortion is held to a very low level.

FIG. 5 shows in somewhat greater detail a transmitter station and a receiver station which turn the features of the invention to account. In this embodiment, each code word is transmitted a number *t* times, when *t* is generally two or more, in succession. At the receiver, the *t* transmissions of the single word are accumulated, for example, in a temporary store, and thereupon read out and supplied to utilization apparatus. Thus, if a portion of a data word at the transmitter station is not accommodated by a speech burst, a repetition of it will very likely be accommodated by a subsequent speech burst. A portion of the repeated transmission is used to fill in the gap. By selecting *t* to be a suitably large number, the likelihood of a complete word being accumulated during *t* successive speech bursts is greatly enhanced.

In the apparatus of FIG. 5, speech signals originating at telephone transmitter 40 are supplied directly to modulator 42 and data signals originating in source 41 are stored on a loop of magnetic tape 45. The data signals may comprise a message made up of code words consisting, for example, of a plurality of tones of different frequencies of the sort shown in FIG. 6. If desired, several tones may be used simultaneously for each digit. This affords additional redundancy. Tape 45 passes by way of write head 46 and is directed to a rigid drum-like support 47. Read head 48 is arranged to rotate within the drum. With tape 45 held immobile about drum 47, that portion of the message on the tape so supported may be read out any desired number of times and supplied by way of variable gain network 44 to modulator 42. With this arrangement, one code word from source 41 may be supplied *t* times to modulator 42, once for each detected speech energy burst.

In order to transmit a data signal, switch 49 is closed to energize one input of AND gate 50 and to trigger flip-flop 51 which in turn generates a brief pulse. This nonrecurrent pulse energizes multivibrator 52 which develops an output signal whose duration is sufficient to advance tape 45 around drum 47 so that a new word may be placed upon the loop for readout. This is accomplished by closing normally open switch 53 which energizes tape advance mechanism 54. The tape advance mechanism thereupon actuates drive wheel 55 or the like to advance the tape. It is to be understood that any means for advancing the tape well known in the art may be used. It is shown here only schematically since, per se, it forms no part of the present invention. As the tape 45 advances, signals from bias oscillator 56 are supplied by way of switch 57 to erase head 58 so that previously written signals are removed from the tape before a new word is written on the tape. Message source 41 is simultaneously energized. It supplies a new word to write head 46. Further, the signal from multivibrator 52 opens normally closed switch 59 so that an energizing signal from speech burst detector 43 supplied by way of AND gate 50 is prevented from reaching drive apparatus 60. It is thus apparent that by closing switch 49, one word from data source 41 is written on tape 45 and advanced to the reading position about drum 47.

Speech signals originating in source 40 are monitored by speech burst detector 43. Detector 43 develops a pulsive control signal from each energy burst of the speech frequency signal applied to it. Thus, a signal of the form shown by way of example in FIG. 4a is applied to detector 43. Detection takes place by means of an envelope detector, e.g., rectifier 61, shunted by resistor 63 and capacitor 64. The rectified signal, as shown in *b* of FIG. 4, is connected to a threshold circuit 62. Rectifier 61 converts the incoming speech wave into a unidirectional wave, resistor 63 and capacitor 64 smooth the unidirectional wave, and threshold circuit 62, derives from the smooth unidirectional wave a succession of pulses of variable amplitude and variable duration. Each pulse corresponds to an energy burst in the speech wave, with the length of each pulse indicating the duration of the corresponding burst. Preferably, the amplitude of each pulse varies sharply at threshold and smoothly above threshold as shown in line *c* of FIG. 4. That is to say, the desired transfer characteristic to maintain an optimum index of modulation is included in threshold circuit 62. Pulses from detector 43 are supplied to variable gain network 44 to adjust the magnitude of data signals for example, those shown in line *d* of FIG. 4 to produce the wave shown at *e*. As a result, the envelope excursions of the modulated signal are maintained relatively a constant.

In addition, the pulsive signal is supplied to the other input of AND gate 50. Thus, so long as start switch 49 is closed, each speech burst pulse passes by way of the AND gate and switch 59 to one-cycle drive mechanism 60. Apparatus 60 responds and causes a rotating arm carrying magnetic head 48 to read the signal recorded on the loop about drum 47 one time. Apparatus 60 then stops and awaits another pulse signal from speech burst detector 43.

As successive speech bursts are detected, drive apparatus 60 actuates the arm carrying the read head and successive repetitions of the word are supplied to the modulator. At the same time, successive speech bursts are counted, for example, by means of counter 65 supplied with the pulsive signals from detector 43. At the end of *t* bursts, counter 65 develops a trigger signal which actuates multivibrator 52 thereupon initiating another erase-write cycle. Tape 45 is advanced, previously recorded material is erased, and a new word is written on the tape and brought into alignment with drum 47. At the end of the advance period, switch 59 is again closed and subsequent speech bursts occasion the read out of newly recorded material.

During the advance period, a number of speech bursts may have occurred. The receiver would, therefore, without further means, lose synchronism with the transmitter and thereafter fail to respond properly. Accordingly, each word transmitted in response to one speech burst carries with it a "start" signal to indicate an oncoming word. For example, the start signal may comprise a signal of specified frequency, e.g., a brief 55 cycle tone, which occurs for three or more intervals as shown in FIG. 6. This signal is developed by oscillator 66 operating at a frequency $f_0$ which is energized by multivibrator 67 whenever a speech burst is detected. Multivibrator 67 has a time-constant equal to the selected start signal interval. By adjusting the position of read head 48 and drive mechanism 60, the start signal may conveniently be inserted at the beginning of each word.

At the receiver, telephone signals received after transmission over channel 69 are supplied directly to reproducer 70 and utilized without further processing. As before, envelope detector 71 recovers the data signals, discards the speech carrier, and supplies the resultant signals to write head 72 positioned within a drum-like support 73, in all respects similar to the comparable apparatus at the transmitter station. A loop of magnetic tape 74 is supported to engage read head 75, erase head 76, and write head 72. Signals read out by way of head 75 are supplied to data utilization apparatus 77. While it is feasible, as in the apparatus of FIG. 1, to employ a threshold circuit at the receiver station, this is unnecessary by virtue of the start signals at frequency $f_0$ which accompany each word. It is most likely that a start signal will be received for each word even though other portions of the word may be lost because of an insufficiently long speech burst carrier. Accordingly, filter 78, tuned to frequency $f_0$ is bridged across the output of detector 71. Recovered start signals are detected, for example, by way of rectifier 79, and used to energize one cycle drive apparatus 80, which in turn rotates write head 72 on its arm within drum 73. The word following the $f_0$ start signal is then written upon the loop of tape. If desired, the $f_0$ start signal may be removed by means of band elimination filter 81 so that it does not appear in the recorded data signal. As successive words are received, one cycle drive 80 is repeatedly actuated and write head 72 repeatedly scans the loop of tape supported on drum 73 and rewrites the incoming signal on the same loop of tape. For simple binary signals or discrete frequency pulses, over-writing of this sort merely saturates the tape at the frequency of the corresponding pulse. The signal may thus be recovered, not withstanding its complete reception during one or more of the repetitive scans of the tape.

Successive start signals are counted in apparatus 82. After *t* successive start signals have been received, indicating that *t* words have been transmitted, multivibrator 83 is actuated and is effective to actuate tape advance mechanism 84 by way of switch 85. Drive wheel 86 is then actuated and pulls tape 74 around the loop. At the same time, erase head 76 is actuated by the closure of switch 87 and the application of signals from erase oscillator 88. To prevent actuation of drive mechanism 80 during tape advance, normally closed switch 89 at the output of detector 71 is opened. During the tape advance, that portion previously recorded is read out by head 75 and supplied to the utilization apparatus. At the conclusion of the tape advance, as determined by the duration of the pulse emitted from multivibrator 83, the tape is again stopped, switch 89 is closed and the next successive $f_0$ signal is sufficient to actuate a write cycle.

Since the tape storage apparatus at both the transmitter and receiver stations is identical and since the tape advance period is likewise identical, the receiver apparatus will be in a condition to receive the next transmitted code word from the transmitter. Synchronism is thus maintained. It will be appreciated, of course, that the tape loop mechanism illustrated for performing the storage and accumulation functions finds numerous counterparts in the art. Hence, particularly for binary code signals, crosspoint switches or matrices of magnetic cores or the like may be used to perform the necessary storage. With either crosspoint switching networks or magnetic core storage devices, over-writing is permitted so that repetitive words transmitted may be integrated before a final read-out takes place.

As is well known in the art of speech analysis, ordinary speech is modulated at relatively low pitch frequencies. For men, the pitch frequencies may be as low as 80 cycles per second. These normal pitch frequency modulations tend to interfere with the transmission of auxiliary signals. For reliable recognition, therefore, it has been found that the receiver requires a signal-to-interference ratio of about 10 db. Although data signal frequencies up to about 80 cycles per second are usable, somewhat lower frequencies have been found to be preferable. The only restriction at the low frequency end is that they be above the syllabic rate. Using frequencies between 30 and 55 c.p.s. for the individual digits, for example, a typical seven digit word may be transmitted in no more than from one to two seconds. Since the most common length of a speech burst is approximately 0.25 second, eight cycles of the lowest frequency may be transmitted for each burst. A complete discussion of speech bursts and their typical lengths is found in an article by Emling and Mitchell in the Bell System Technical Journal for November 1963 at page 2875.

The above-described arrangements are, of course, merely illustrative of the application of the principles of the invention. Numerous other arrangements may be devised by those skilled in the art without departing from the spirit and scope of the invention.

What is claimed is:

1. A system for transmitting data signals along with speech signals which comprises, at a calling station, a source of speech signals, means for detecting discrete energy bursts in said speech signals, a source of data signals, means responsive to said detected energy bursts for impressing said data signals on said speech signals as a modulation sideband thereof, and at said called station, means including an envelope detector for separating said sideband signals from said speech signals.

2. A system for transmitting coded data signals along with speech signals which comprises, at a calling station, a source of speech signals, means for detecting discrete energy bursts in said speech signals, a source of coded data signals, a balanced modulator supplied continuously with said speech signals, means responsive to each of said detected energy bursts for supplying a selected portion of said coded data signals to said modulator, means for transmitting the resulting modulated signal including at least one sideband thereof to a called station and, at said called station, means for utilizing said modulated signal to reproduce said speech signals, means for separating said sideband signal from said modulated signal, and means for utilizing said separated sideband for reproducing said coded data signals.

3. A system for transmitting low frequency code signals along with a speech signal which comprises: a calling station and a called station interconnected by a voice frequency transmission circuit, modulator means at said calling station supplied with speech message signals, means for detecting energy bursts in said message signals a source of a code signal, means responsive to each detected speech burst in said message signals for supplying said code signal from said source to said modulator, means for transmitting the modulated signal with one sideband only developed by said modulator to said called station, and means at said called station for supplying said modulated signal to a speech signal receiver, means including an envelope detector for recovering said code signal from said sideband signal, means for detecting speech bursts in said modulated signal means responsive to each detected speech burst in said modulated signal for storing one of said recovered code signals, and means responsive to a preselected number of detected speech bursts for supplying said stored code signals to a code signal receiver.

4. A system for transmitting low frequency signals along with a speech signal which comprises; a calling station which comprises, modulator means supplied with speech message signals, means for detecting discrete speech bursts in said message signals, a source of low frequency data signals, variable gain network means supplied with said data signals, means responsive to said detected speech bursts for adjusting the transmission characteristic of said network means, means responsive to said speech bursts for supplying signals from said data source to said network, means for supplying signals from said network to said modulator means, and means in circuit relation with said modulator for selecting for transmission said modulated resultant signal with one sideband only; a called station which comprises, means for utilizing said modulated signal for reproducing said speech message signals, means including an envelope detector for separating said sideband signal from said modulated signal, and means for utilizing said sideband signal to reproduce said low frequency data signal; and a voice frequency transmission circuit interconnecting said calling station and said called station.

5. In combination, a calling station and a called station interconnected by a voice frequency transmission circuit, modulation means at said calling station for adjusting the amplitude of an applied carrier signal in accordance with the amplitude of an applied modulating signal to produce a modulated signal including sideband signals, a source of voice frequency signals, means for applying said voice frequency signals as a carrier to said modulation means, a source of low frequency data signals, means responsive to bursts of speech energy in said message signals for developing a control signal, means responsive to said control signal for supplying data signals from said source as a modulating signal to said modulator, means responsive to said control signal for continuously adjusting the index of modulation of said carrier by said modulating signal in accordance with the amplitude of said control signal, means for selecting for transmission to said called station said modulated carrier and one of the resultant sideband signals only, and, at said called station, means for utilizing said modulated carrier and sideband signals to reproduce said voice frequency signals, means including an envelope detector supplied with said modulated carrier signal and sideband signal for separating said sideband signal from said carrier, and means for utilizing said detected sideband signals to reproduce said low frequency data signals.

6. A system for transmitting data and speech signals simultaneously over a common speech channel comprising a source of speech message signals, means for detecting bursts of speech energy in said signals for producing an enabling signal which persists for the durations of said energy bursts, a source of auxiliary data signals, means for storing said auxiliary signals, means responsive to said enabling signal for reading out said auxiliary signals during said energy bursts, variable gain network means supplied with said auxiliary signals read out of storage, means responsive to said energy bursts for continuously adjusting the gain of said network, modulator means, means for supplying said message signals to said modulator as a carrier, means for supplying gain adjusted auxiliary signals from said network to said modulator as a modulating signal, means for transmitting said carrier and at least one sideband thereof to a receiver station, and at said receiver station, means for utilizing said carrier and sideband signal to reproduce said speech message, means for independently detecting said sideband signal, means for storing said detected sideband signal, means for detecting discrete energy bursts in said carrier signal, and means responsive to said detected energy bursts for entering said sideband signals in said storage means, and means for reading out said stored sideband signals for utilization.

7. A system for transmitting data and speech signals as defined in claim 6 wherein said means for detecting bursts of speech energy in said signals includes a rectifier supplied with said speech message signals, a smoothing network supplied with said rectified signals, and a threshold circuit supplied with said integrated signal energy.

8. A system for transmitting data and speech signals as defined in claim 6 wherein auxiliary signals are read out of said means for storing a preselected number of times in accordance with preselected number of enabling signals, and wherein said detected sideband signals at said receiver are read into storage said preselected number of times in accordance with a preselected number of speech energy bursts.

9. Apparatus for transmitting coded data signals along with speech signals to a receiver station which comprises, modulation means for adjusting the amplitude of an applied carrier signal in accordance with the amplitude of an applied modulating signal to produce a modulated signal including sideband signals, a source of voice frequency signals, means for applying said voice frequency signals as a carrier to said modulation means, a source of low frequency data signals, means responsive to bursts of speech energy in said voice frequency signals for developing a control signal, means responsive to said control signal for supplying data signals from said source as a modulating signal to said modulator, means responsive to said control signal for continuously adjusting the index of modulation of said carrier by said modulating signal in accordance with the amplitude of said control signal thereby to maintain the envelope excursions of said modulated signal relatively a constant, and means for selecting for transmission said carrier and one of the resultant sideband signals.

10. Apparatus for receiving a modulated carrier signal including at least one sideband thereof in which said carrier and sideband represent speech frequency signals and low frequency code signals, respectively, which comprises, means for receiving said carrier signal and sideband signal, a speech signal receiver, means for supplying said modulated signal to said speech signal receiver, means including an envelope detector for recovering said code signals from said sideband signal, means for detecting bursts of speech energy in said modulated signal, means responsive to each detected speech burst for storing one of said recovered code signals, a code signal receiver, and means responsive to a preselected number of detected speech bursts for supplying said stored code signals to said code signal receiver.

References Cited

UNITED STATES PATENTS

| | | | |
|---|---|---|---|
| 2,243,719 | 5/1941 | Peterson | 325—187 X |
| 2,287,862 | 6/1942 | Brian | 325—152 X |
| 3,054,895 | 9/1962 | Forsyth | 325—15 |
| 3,061,783 | 10/1962 | Noller | 340—171 X |
| 2,701,305 | 2/1955 | Hopper | 179—15 X |

OTHER REFERENCES

"Radio Engineers Handbook," F. E. Terman, McGraw-Hill New York, N.Y., 1943, page 532 relied on.

ROBERT L. GRIFFIN, *Primary Examiner.*

B. V. SAFOUREK, *Assistant Examiner.*